(12) United States Patent
Bunte et al.

(10) Patent No.: US 10,848,419 B2
(45) Date of Patent: Nov. 24, 2020

(54) DATA TRANSMISSION METHOD, COMMUNICATION NETWORK AND MASTER PARTICIPANT

(71) Applicant: BECKHOFF AUTOMATION GMBH, Verl (DE)

(72) Inventors: Thorsten Bunte, Gütersloh (DE); Holger Büttner, Berlin (DE); Erik Vonnahme, Salzkotten (DE); Dirk Janssen, Verl (DE); Thomas Rettig, Rheda-Wiedenbrück (DE); Hans Beckhoff, Verl (DE)

(73) Assignee: Beckhoff Automation GmbH, Verl (DE)

( * ) Notice: Subject to any disclaimer, the term of this patent is extended or adjusted under 35 U.S.C. 154(b) by 134 days.

(21) Appl. No.: 15/840,794

(22) Filed: Dec. 13, 2017

(65) Prior Publication Data
US 2018/0176132 A1 Jun. 21, 2018

(30) Foreign Application Priority Data
Dec. 21, 2016 (DE) .................. 10 2016 125 128

(51) Int. Cl.
*H04L 12/741* (2013.01)
*H04L 12/40* (2006.01)
(Continued)

(52) U.S. Cl.
CPC .............. *H04L 45/74* (2013.01); *H04L 12/40* (2013.01); *H04L 12/423* (2013.01); *H04L 69/22* (2013.01)

(58) Field of Classification Search
CPC ....... H04L 45/74; H04L 12/40; H04L 12/423; H04L 69/22; H04L 12/403; H04L 12/40006
See application file for complete search history.

(56) References Cited

U.S. PATENT DOCUMENTS 7,031,904 B1 * 4/2006 Wilson ................ H04L 67/1097
370/338
2011/0184533 A1 * 7/2011 Maruyama ......... G05B 19/4185
700/3

(Continued)

FOREIGN PATENT DOCUMENTS

DE 102014109060 B3 9/2015
DE 102015120242 B3 2/2017

*Primary Examiner* — Kibrom T Hailu
(74) *Attorney, Agent, or Firm* — Dorsey & Whitney LLP (57) ABSTRACT

Data transmission in a communication network is performed via a transmission path with which a master participant and at least one slave participant communicate. The master participant outputs messages on the data transmission path with which the slave participants exchange data on the fly. The messages output by the master participant contain datagrams which comprise a control data field and a payload field, where the control data field has a command field and an address field. In the case that at least one message has at least one datagram which is a write datagram in which the command field defines the data transmission procedure to be performed by a slave participant with the payload field as a write procedure, at least the control data field of a further datagram is arranged between the control data field of the write datagram and the payload field of the write datagram.

20 Claims, 2 Drawing Sheets

(51) Int. Cl.
*H04L 12/423* (2006.01)
*H04L 29/06* (2006.01)

(56) References Cited

U.S. PATENT DOCUMENTS

2012/0120960 A1* 5/2012 Nishioka ........... H04L 12/40013
370/392
2013/0018979 A1* 1/2013 Cohen ................... H04L 67/125
709/217

* cited by examiner

DATA TRANSMISSION METHOD, COMMUNICATION NETWORK AND MASTER PARTICIPANT

CROSS-REFERENCE TO RELATED APPLICATION

This application claims priority to German Patent Application DE 10 2016 125 128.3, filed Dec. 21, 2016, entitled DATENÜBERTRAGUNGSVERFAHREN, KOMMUNIKATIONSNETZWERK UND MASTER-TEILNEHMER, which is incorporated by reference herein, in the entirety and for all purposes.

FIELD

The invention relates to a method for data transmission in a communication network, with a data transmission path via which a master participant and a slave participant communicate with one another, and a master participant.

BACKGROUND

In production and process automation, fieldbus systems are used in which locally arranged devices of machine peripherals such as input and/or output modules, drives and operator terminals are connected to control units via a real-time communication system. The data exchange on the fieldbus takes place mainly on the basis of the master-slave principle. The control units on the fieldbus are the active bus participants, also referred to below as the master participants. They are in possession of the bus access authorization and define the data transfer on the fieldbus. The passive participants, also referred to below as the slave participants, are normally the machine peripheral devices. They have no bus access authorization and can only acknowledge received data or transfer data at the request of a master participant.

Fieldbuses normally use the Ethernet standard to network the participants in the communication system in which the data exchange takes place in the form of data packets. In order to be able to meet the real-time requirements in production and process automation, special protocols are defined for industrial Ethernet networks with which data exchange rates of 100 Mbit/s can currently be achieved. However, Ethernet networks having a data transmission rate of 1 Gbit/s and more are already in use in the consumer domain.

The aim with industrial Ethernet is to achieve similarly high data transmission rates. However, the requirements in production and process automation differ from those of office data communication. Thus, in contrast to the consumer domain in which large data volumes are normally transmitted by a small number of participants in communication networks, a data communication between many participants is normally performed in communication networks in production and process automation, wherein the participants in each case exchange only a small amount of data.

In order to provide a fast industrial Ethernet system in which the messages have a substantial payload component, Ethernet protocols such as, for example, the EtherCAT protocol are used in which the data packets, also referred to below as messages, are processed on the fly. Datagrams which in each case comprise a control data field and a payload field are embedded in the Ethernet message. The control data field contains a command field which indicates the data transmission procedure which is to be performed by the slave participant with the payload field, i.e. whether a read procedure is to be performed in which the participant is intended to extract data from the payload field, or a write procedure in which the slave participant is intended to insert data into the payload field. The slave participant or the data area in the slave participant with which the slave participant is intended to exchange data during the transmission of the payload field is then defined in the address field of the control data field.

The slave participant begins the data processing immediately after receiving the control data field of a datagram in the Ethernet message and evaluates the command field and the address field. If the slave participant is addressed, the slave participant, in the case of a read datagram, then extracts the output data intended for the participant from the payload field while the datagram in the Ethernet message passes through the slave participant. In the case of a write datagram, input data are inserted by the slave participant on the fly into the payload field in the datagram. The Ethernet messages are delayed only briefly by the slave participant during the processing of the datagrams on the fly.

If, in the case of industrial Ethernet, as in the consumer domain, a data transmission rate of 1 Gbit/s is intended to be used instead of the present standard transmission rate of 100 Mbit/s, the transmission time between the participants is reduced to one tenth of the previous transmission time. The transit delay of Ethernet messages in standard Gbit technology between two participants is around 1 µs. However, in order to be able to process the Ethernet message in the slave participants on the fly still with a shorter delay, it is then necessary to increase the processing speed of the slave participants, particularly in the case of write datagrams. If the slave participant, in processing the control data field in the datagram, establishes that it is addressed and a write datagram is present into which data are intended to be inserted, it must be guaranteed that the slave participant then provides the input data sufficiently quickly when the payload field of the write datagram passes through the slave participant in order to avoid a delay in the transmission. In order to enable a higher data transmission rate, the slave participant can increase the clock rate in the internal data processing for faster provision of the input data. However, this requires the use of high-performance processors, resulting in increasing hardware costs and a greater power dissipation in the slave participant.

SUMMARY

The present invention provides a method for data transmission in a communication network, a communication network and a master participant which enable the data transmission rates on the data transmission path to be increased in an energy-efficient and low-cost manner also in the case of a processing of messages by the slave participants on the fly.

EXAMPLES

The data transmission in a communication network is performed via a transmission path via which a master participant and at least one slave participant communicate with one another. The master participant outputs messages on the data transmission path with which the slave participants exchange data on the fly. The messages output by the master participant contain datagrams which in each case comprise a control data field and a payload field, wherein the control data field has a command field and an address field. The command field defines the data transmission procedure which is to be performed by a slave participant with the payload field, and the address field defines the data area in the slave participant with which the slave participant is intended to exchange data when the payload field is in transit. In the case of at least one message which has at least one datagram which is a write datagram in which the command field defines the data transmission procedure which is to be performed by a slave participant with the payload field as a write procedure, at least the control data field of a further datagram is arranged between the control data field of the write datagram and the payload field of the write datagram.

A combined datagram in which, along with a writing of data to the payload field, a reading of data from the payload field is also additionally intended to be performed by the slave participant is also characterized below as a write datagram.

A data transmission method, a communication system and a master participant give a slave participant in a communication network more time to process a write datagram addressed to the slave participant. In the case of write datagrams which are processed by the slave participant on the fly, the slave participant, in order to avoid a delay in the message transmission, must already have provided the input data to be written to the write datagram when the payload field of the write datagram is received by the slave participant. Due to the splitting of the write datagram into a control data field and a payload field and their separate arrangement in the message in which at least the control data field of a further datagram is arranged between the control data field and the payload field of the write datagram, the time which the slave participant has at its disposal to provide input data after receiving the control data field of the write datagram is extended if it establishes in evaluating the control data field that a write datagram is involved and a data area in the slave participant is addressed. Due to the distancing of the payload field from the control data field in the write datagram, the reception of the payload field of the write datagram by the slave participant is deferred so that the slave participant can use this additional time to determine and read the input data in its memory which are to be written. Even in the case of high data transmission rates on the transmission path, the possibility thus exists for "slow" processors to be used for processing in the slave participant, since sufficient time is given to the processor in the slave participant for the memory access in order to provide the input data for writing to the write datagram.

In contrast to the write datagrams which, as explained above, also include combined datagrams in which both a writing of data to the payload field and a reading of data from the payload field are intended to be performed by the slave participants, there is no need for a division of the read datagrams in which the command field in the control data field defines the data transmission procedure which is to be performed by the slave participant with the payload field as a read procedure. The control data field and the payload field in the read datagram may be present as a uniform block, since no data processing by the processor in the slave participant is necessary for the read procedure from the read datagram during the message transmission. There may therefore also be no resulting delay in the message transmission in the slave participant in the case of read datagrams due to a possibly delayed processing in the slave participant. The possibility obviously exists to position the payload field separately from the control data field in the message in the case of read datagrams also, if, for example, a uniform datagram structure is intended to be established in the message, wherein all control data fields of the datagrams are arranged first, followed by all payload fields of the datagrams.

The message may essentially be designed in such a way that a header data field is provided in which an identification data field is arranged whose datum indicates whether, in the case of the datagrams, in particular the write datagrams in the message, the control data field and the payload field are arranged separately. With this design, the possibility exists to dispatch not only messages in which the control data field and the payload field of the write datagrams in the message are arranged separately, but also messages in which this is not the case. The message structure can thus be flexibly adapted to the design of the hardware in the communication network, in particular as far as the slave participants are concerned.

The processing of messages in which the control data field of the write datagram is arranged separately from the payload field of the write datagram can be implemented in the slave participants in a resource-saving manner if the messages are designed in such a way that the control data field of the datagram and the payload field of the datagram in each case have a fixed data length. If the identification data field in the header data field of the message indicates that the control data field and the payload field are arranged separately in the write datagrams in the message, the slave participant detects the number of write datagrams in the message. If, in evaluating the address field in the control data field of a write datagram, the slave participant then establishes that a data area in the slave participant is addressed from which the slave participant is intended to write data to the payload field of the write datagram, the slave participant can then simply establish the position of the area in the payload field of the write datagram addressed to it from the detected number of write datagrams and the known fixed length of the control data field and the payload field in order to then insert the data into the write datagram at the correct position.

Alternatively, the possibility also exists for an identification data field, the datum of which, as a value or length indication, indicates the position of the allocated payload field to be provided in the control data field of the write datagram in the message. The slave participant can then determine the position of the area in the payload field of the write datagram addressed to it by evaluating this identification data field, if the write datagram is addressed to it.

In the case of a separate arrangement of the control data field and the payload field in the write datagram, a further possibility of informing the slave participant of the data length between the control data field and the payload field consists in setting the bit interval as a fixed default value. The data length between the control data field and the payload field can be specified by the master participant for the slave participants, for example during the initialization. The possibility also exists of providing a further identification data field, the datum of which indicates the bit interval, in the header data field of the message.

The messages output by the master participant can be designed in such a way that the control data fields of all write datagrams are arranged first in the message. This simplifies the message structure for the master participant and increases the bit interval between the control data fields of the write datagrams and the payload fields of the write datagrams. In addition, the bit interval can be further increased by arranging the read datagrams in which the control data field defines the data transmission procedure which is to be performed by a slave participant with the payload field as a read procedure in the message between the control data fields of the write datagrams and the payload fields of the write datagrams.

The communication network can furthermore be designed in such a way that the data transmission rate on the transmission path is greater than the data transmission rate in at least one of the slave participants. By designing the write datagrams in the message with a bit interval between the control data field and the payload field which corresponds at least to the length of the control data field of a further datagram, the communication network and the slave participants can be operated at different data transmission speeds. In particular, the possibility exists of performing a fast data transmission on the data transmission path without having to use slave participants which use the same fast data transmission rate internally for data processing. The fieldbus protocols on the data transmission path can thus use data transmission rates in the 1 Gbit/s or 10 Gbit/s data range, wherein the slave participants can operate simultaneously at an internal data rate of 100 Megabit/second.

The processor which performs the data access to the memory in the slave participant can be operated at a clock rate which is orders of magnitude less than the data transmission rate on the transmission path without the message transmission being held up beyond the technically specified transmission delay in the nanosecond range. Due to the arrangement of the control data field at a distance from the payload field in the write datagram, the processor is in fact additionally allowed time to access the memory in order to provide the addressed data for the writing to the payload field. The elimination of high-performance processors reduces the hardware costs of the slave participants and simultaneously keeps their dissipated power, which would result from a higher processor power, at a low level.

BRIEF DESCRIPTION OF THE DRAWINGS

The above-described properties, features and advantages of this invention and the way in which they are achieved will become clearer and more clearly understood in association with the following description of the exemplary embodiments which are explained in greater detail in association with the drawings. Here in schematic illustration in each case.

DETAILED DESCRIPTION

The invention will be illustrated and described in detail with the aid of the preferred exemplary embodiments. Nevertheless, the invention is not restricted to the examples disclosed. Rather, other variants may be derived therefrom by a person skilled in the art without departing from the protective scope of the invention.

Communication networks are used in industrial automation in the form of serial bus systems in which locally arranged devices communicate with control units. The participants are networked with one another via a fieldbus. Data are exchanged between the participants on the basis of the master-slave principle. The active bus participants, also referred to as master participants, are the control units which are in possession of the bus access authorization and define the data transfer on the serial bus. Conversely, the machine peripheral devices, also referred to as slave participants, form the passive bus participants which have no bus access authorization, i.e. they may only acknowledge received messages or transmit messages to a master participant at the latter's request.

Fieldbus systems with a master-slave architecture are operated with different transmission protocols, wherein protocols based on Ethernet technology are preferably used. With Ethernet technology, the data are transmitted in a packet-oriented manner. The standard Ethernet data packet is 1518 bytes long, wherein 18 bytes are reserved for a header segment and an end segment. In the header segment of the Ethernet data packet, a data field is provided in which the Ethernet protocol type is defined with which the payload in the Ethernet data packet is intended to be interpreted.

Protocol types which guarantee a real-time capability are preferably used in industrial automation. A real-time standard of this type is the EtherCAT protocol, in which the payload in the Ethernet data packet is processed by the slave participants on the fly. With the EtherCAT protocol, the payload block in the Ethernet message is divided up into an EtherCAT header part, also referred to below as the EtherCAT header, and one or more EtherCAT datagrams. The EtherCAT header contains identification data fields which, inter alia, define the length of the EtherCAT datagrams.

The EtherCAT datagrams are in turn subdivided into a header segment and an end segment and an intermediate payload segment. In the header segment of the datagram, also referred to as the datagram header, a command field is provided which defines the data transmission procedure which is to be performed with the slave participant, and an address field which designates the data area in the slave participant with which the slave participant is intended to exchange data during the transmission of the payload segment in the datagram.

Ethernet-based fieldbus protocols with a data transmission rate of 100 Mbit/s have become established in automation technology. In order to be able to perform faster control processes, an objective in industrial automation is to be able to use transmission speeds of 1 Gbit/s or more in future in Ethernet systems also, as they are already used in the consumer domain for data transmission. However, in order to be able to use fast communication networks of this type effectively for control, the slave participants in the communication network must then also perform a corresponding fast data processing in order to provide the data for the data transmission in a timely manner and thus avoid a delay in the message traffic. However, this means that high-performance processors and therefore expensive hardware are required in the slave participants. Faster processors furthermore result in a higher dissipated power.

In addition, a multiplicity of slave participants normally communicate with one another in automation technology via the serial bus system, so that even one slave participant in the network which cannot provide its data sufficiently quickly for the message traffic due to lacking internal processing speed can significantly delay the data transmission.

In a communication network with a master-slave architecture, wherein the slave participants exchange data on the fly with the message output by the master participant, an unwanted delay can occur in the message transmission, particularly if the message has at least one datagram which is a write datagram in which the command field defines the data transmission procedure which is to be performed by a slave participant with the payload field as a write procedure. In this case, if the slave participant, following the evaluation of the command field and the address field in the control data field of the datagram, establishes that the datagram is a write datagram and a data area in the slave participant is addressed, it must provide the data before the payload field of the datagram is received by the slave participant in order to be able to write data to the datagram with no delay during the transit of the payload field.

In order to prevent a delay in the message transmission, the slave participant then has only the data provision time available to it which is required in order to transmit the data in the message which are located between the control data field of the write datagram and the payload field of the write datagram. These data arranged between the control data field and the payload field in the write datagram are restricted by default to a few bytes.

A combined datagram, in which a reading of data from the payload field is then also intended to be performed by the slave participant along with a writing of data to the payload field, is also characterized below as a write datagram.

In the case of read datagrams in which the command field defines the data procedure which is to be performed by the slave participant with the payload field as a read procedure, the slave participant must only extract data from the payload field of the read datagram, wherein the further processing of the extracted data in the slave participant can then be performed at a later time following the transmission of the message. The internal data processing speed in the slave participant is therefore uncritical in relation to the message transit in the case of read datagrams.

In the case of write datagrams, in order to increase the data length between the control data field of the write datagram and the data area in the payload field of the write datagram into which the slave participant is intended to insert data and therefore give the slave participant more time to provide the data, the message structure is designed according to the invention in such a way that at least one control data field of a further datagram is inserted in the message between the control data field of the write datagram and the payload field of the write datagram. With the division of the write datagrams and the separate arrangement of the control data field and payload field of the write datagram with the interspersed control data field of a further datagram, the time that is available between the reception of the control data field of the write datagram and the reception of the addressed payload area in the payload field for the slave participant to fetch the data from the required physical address in the slave participant and provide said data for writing to the addressed payload area in the payload field of the read datagram is extended. The slave participant can thus be operated at an internal clock rate which is substantially less than the data transmission rate on the transmission path. A fast 1 Gbit or 10 Gbit Ethernet protocol, for example, can then be used on the transmission path, whereas the slave participant performs the memory access internally at a clock rate of 100 Mbit/s.

The write datagrams are preferably divided and arranged in the message by the master participant in such a way that the control data fields of all write datagrams are arranged first, then followed by the associated payload fields of all write datagrams, as a result of which the bit interval between the control data field and the payload field can be further increased in a simple manner. In order to give the slave participant even more time following the evaluation of the control data field in the write datagram for the provision of the payload for writing to the payload field of the write datagram, the read datagrams are also arranged between the control data fields of the write datagrams and the payload fields of the write datagrams.

In order to be able to design the communication network flexibly, the possibility furthermore exists for the master participant to be able to output not only messages in which the control data field and the payload field of the write datagrams are arranged in a distributed manner, but also messages in which the write datagrams are not divided in this way. The master participant can then respond in each case individually to the design of the slave participants in the communication network and dispatch messages with divided write datagrams, for example only if, due to a reduced internal clock rate compared with the data transmission rate on the data transmission path, the slave participants require an extended bit interval between the reception of the control data field in the write datagram and the reception of the correspondingly addressed payload field area in the write datagram in order to provide the data which are to be written.

The slave participant can also be designed in such a way that two operating modes are supported. In a first operating mode, the write data are provided in a timely manner due to a sufficiently high delay, and for this reason the write datagrams are not divided. In the second operating mode, the write datagrams are divided and the slave participant operates with lower latency. The switchover between the two operating modes can preferably be performed by the master participant. On activation, the first operating mode with higher latency is first active, thereby ensuring that the master participant can also communicate with slave participants which do not control a division of the write datagrams. The master participant then checks the slave participants in the network for compatibility with divided write datagrams and then switches the slave participants which can perform the division of the write datagrams to the second operating mode with low latency.

The invention is explained below using the example of an Ethernet-based fieldbus system in which the EtherCAT protocol is used for data transmission. However, the invention is not restricted to the EtherCAT protocol. The invention can essentially be used in all communication networks in which the participants process the messages on the fly.

Figure 1:
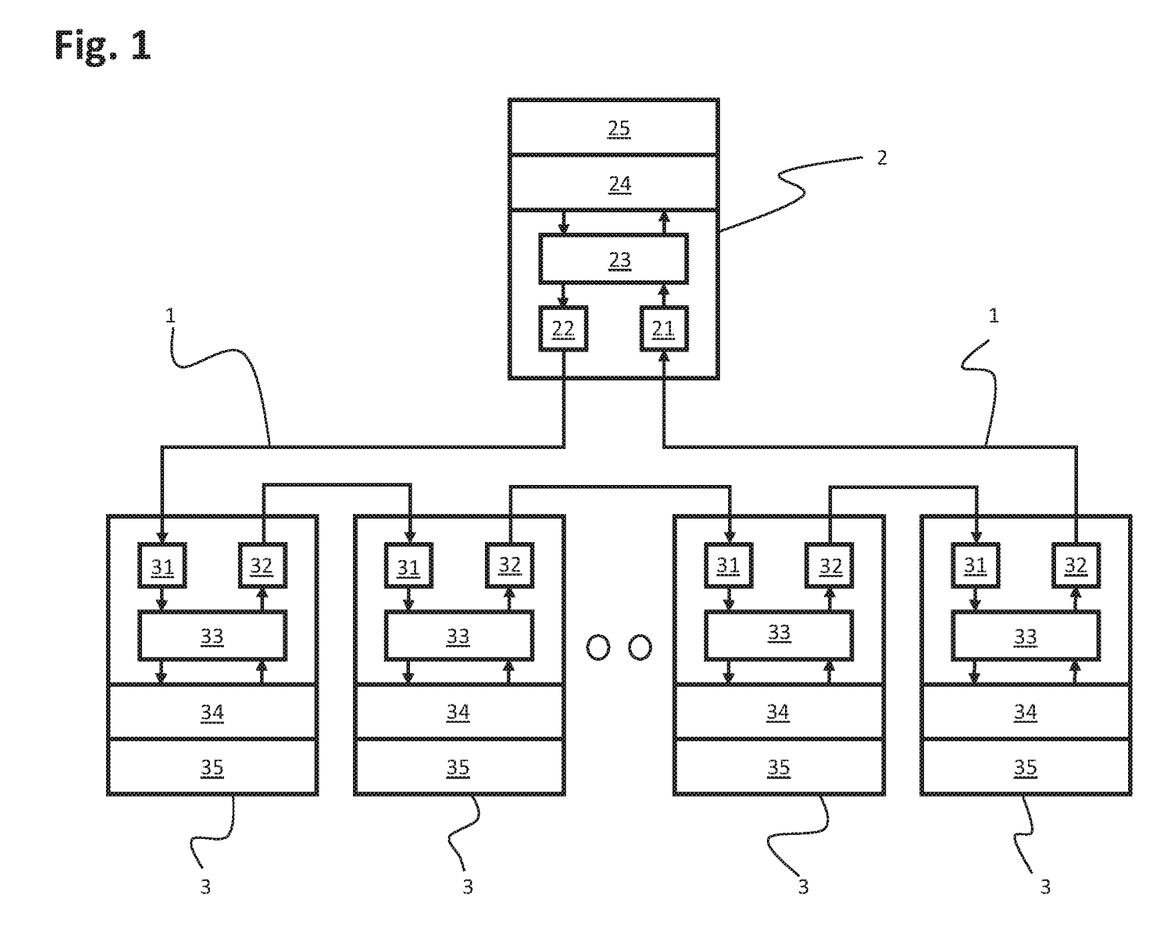
FIG. 1 shows schematically the structure of a serial bus system.

FIG. 1 shows schematically a possible design of a fieldbus system. The fieldbus system has a data transmission path 1, for example an electrical line or an optical waveguide. The bus participants are connected to the transmission path 1, wherein a distinction is made between the active bus participants, i.e. the master participants, and the passive bus participants, i.e. the slave participants. FIG. 1 shows a design with one master participant 2 and four slave participants 3.

In EtherCAT technology, the possibility exists of networking a master participant with up to 65534 slaves. The master participant 2 and the slave participants 3 can be connected directly to the transmission path 1 or can be connected to the transmission path 1 via an autonomous interface module. Circles are drawn as placeholders between the second and third slave participant 3 to clarify the extension facility of the network.

The performance of the data transmission on the transmission path 1 is defined by the communication protocol, in the present case the EtherCAT protocol. The EtherCAT protocol is implemented in the master participant 2 in a fieldbus connection 23. The communication protocol parts necessary for the slave participants 3 are stored in a sleeve connection 33.

The EtherCAT network logically represents an open ring bus in which the master participant 2 outputs messages at one end onto the transmission path 1 and receives them back at the other end, processed by the slave participants 3. As shown in FIG. 1, the master participant 2 and each slave participant 3 in each case have a transmitter 22, 32 to dispatch the messages on the transmission path 1 and a receiver 21, 31 to receive the messages on the transmission path 1.

The message transmission takes place in such a way that the fieldbus connection 23 of the master participant 2 outputs the message 1 via its transmitter 22 to the first slave participant 3, from the perspective of the transmitter 22 in the master participant 2, on the transmission path 1. The first slave participant 3 receives the message via its receiver 31, processes the message on the fly through its slave connection 33 and then forwards the processed message, only delayed by a few bits, via its transmitter 32 to the next slave participant on the transmission path 1. The last slave participant on the transmission path 1 then sends the message processed by all slave participants on the transmission path 1 back to the receiver 21 of the master participant 2.

In the EtherCAT network, the transmission path is normally designed directionally, wherein the network, from the perspective of the master terminal, forms a physical line and the messages pass through all slave participants twice, i.e. on the outgoing path and on the return path. The message processing by the slave participants on the fly is preferably performed on the outgoing path in the EtherCAT network. The return path is used for signal amplification and for locating and closing interruptions on the transmission path. In the EtherCAT network, the line structure can also be expanded by means of branches on any slave participants to form a flexible tree structure.

Figures 2, 3:
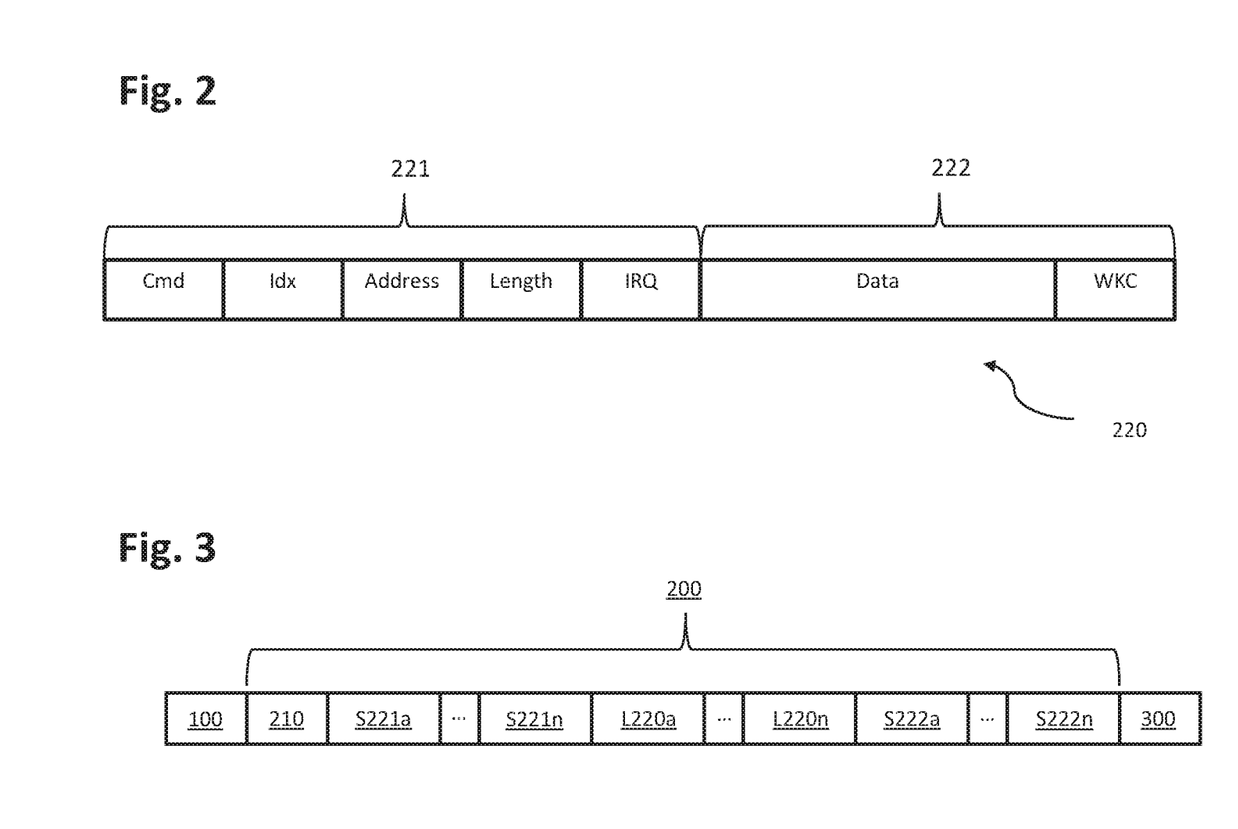
FIG. 2 shows schematically the structure of a write datagram.
FIG. 3 shows schematically the structure of a message.

The message generation takes place in the fieldbus connection 23 of the master participant 2. In the EtherCAT protocol, the fieldbus connection 23 generates an Ethernet telegram in the master participant 2, as shown in FIG. 3, which is made up of a header data field 100, also referred to below as the Ethernet header, a payload field 200 and a check character field 300 at the end. The destination address and source address are defined in the Ethernet header 100. The protocol with which the data in the payload field 200 are to be interpreted is furthermore indicated in the Ethernet header 100. In the EtherCAT network, the example embodiment shown, the EtherCAT protocol is indicated here. The check character field 300 at the end of the Ethernet message indicates an FCS (Frame Check Sequence) in order to be able to detect errors in the data transmission.

The payload field 200 in the middle of the Ethernet message then contains the actual EtherCAT data packet which has a length of up to 1500 bytes in the standard Ethernet message frame. The EtherCAT data packet is in turn made up of a header part 210, also referred to as the EtherCAT header, and a plurality of datagrams 220. The datagrams 220 in each case have a control data field 221 and a payload field 222. FIG. 2 shows an example of the datagram structure. The control data field 221 of the datagram 220 comprises a command field Cmd, an identification field Idx, an address field Address, a length field Length and an interrupt field IRQ. The payload field 222 comprises a data field Data and an end field WKC.

The command field Cmd indicates, inter alia, the manner in which the datagram is intended to be processed by the slave participant. The command field Cmd can characterize a read datagram with a first value, i.e. a datagram in which the content of the payload field Data in the datagram is to be read by the slave participants 3. With a second value, the command field Cmd can alternatively characterize the datagram as a write datagram, i.e. a datagram to whose payload field Data data are intended to be written by the slave participants 3. According to a third value, the command field Cmd can also characterize the datagram as a read/write datagram in which both a reading of data from the payload field Data and a writing of data to the payload field Data are intended to be performed by the slave participants 3. Combined datagrams of this type are treated below as write datagrams. With a fourth value, the command field Cmd can characterize the datagram as an empty datagram, so that the slave participants 3 leave the payload field Data unchanged.

With the identification field Idx, the master participant 2 characterizes the datagram 220 in order to be able to allocate it simply once more after reception. The address field Address indicates the slave participant(s) 3 which is/are to be selected in order to perform the data exchange procedure specified in the command field Cmd. The addressing can be performed in different ways, adapted to the network requirements. The possibility exists of a physical addressing of an individual slave participant 3, a plurality of slave participants 3 or all slave participants 3 in the context of broadcast messages. Alternatively, however, a logical addressing can also be performed. With logical addressing, the physical addresses of the slave participants 3 are pre-allocated to logical addresses, wherein the allocation is stored in advance in FMMUs (Fieldbus Memory Management Units), which form part of the slave connections 33 of the slave participants 3.

On receiving a datagram 220 with logical addressing, the slave connection 33 in the slave participant 3 then checks whether an address match with the stored logical addresses is present and then defines the corresponding allocated physical address in the slave participant 3. With the logical addressing, it is possible to map any memory areas in the slave participant 3 also bit-by-bit onto any logical addresses and therefore address a multiplicity of slave participants 3 simultaneously, for example with one datagram 220. The logical addressing is suitable, in particular, for transmitting process data between the master participant 2 and the slave participants 3. The physical addressing is preferably used to transmit parameter data.

The length field Length in the control data field 221 of the datagram 220 indicates the length of the data field Data in the payload field 222. The interrupt field IRQ defines an interrupt which is to be indicated by the slave participant 3 to the master participant 2.

The data which are to be exchanged between the master participant 2 and the slave participants 3 are transferred with the data field Data in the payload field 222 of the datagram 220. The end field WKC in the payload field 222 of the datagram 220 is a working counter which is incremented by each slave participant 3 which is addressed and has successfully processed the datagram 220.

As shown in FIG. 1, the fieldbus connection 23 in the master participant 2 is connected to a processor 24 in the master participant 2 which in turn communicates with a memory 25. The processor 24 of the master participant 2 performs the control tasks, wherein the processor 24 uses input process images for individual control tasks in order to define output process images therefrom. At least one datagram is normally allocated in each case to the input and output process images of the individual control tasks. The write datagrams serve to supply the input process images for the control task, wherein the slave participants write the corresponding payload to the write datagrams. The output process images are transmitted with the read datagrams onto the slave participants which then take over the allocated payload.

The processing of the datagrams 220 in the slave participants 3 is performed on the fly through the slave connection 33. The telegram is then transmitted, delayed by a few bits, from the transmitter 32 in the slave participant 3 to the next slave participant 3. The slave connection 33 in the slave participant 3 evaluates the control data field 221 of the datagram 220 in order to establish, on the basis of the command field Cmd, which data transmission procedure is to be performed with the payload field of the datagram 220. The slave connection 33 in the slave participant 3 then determines, on the basis of the address field Address, whether a data area in the slave participant 3 is addressed with which the slave participant 3 is intended to exchange data during the transmission of the payload field 222 Data.

As shown in FIG. 1, the slave connection 33 of the slave participant 3 is connected to a processor 34 which in turn communicates with a memory 35 in order to process the payload provided for the slave participant. In the case of a read datagram, the slave connection 33 reads the payload allocated to the slave participant 3 during the transmission of the data field Data in the datagram 220 of the message and forwards the payload to the processor 34. The processor 34 then stores the payload in the addressed memory areas in the slave participant 3. In the case of a write datagram, the processor 34 extracts the payload from the addressed memory areas in the slave participant 3 and makes the payload available to the slave connection 33 in the slave participant 3 so that the slave connection 33 can write the payload when the allocated area in the data field Data of the datagram passes through in the slave participant.

For the provision of the payload during the transmission of the write datagram, the processor 34 in the slave participant 3 has the time available to it which the data in the write datagram of the message require for the transmission through the slave participant 3, plus the time which elapses between the control data field in the write datagram and the addressed data area in the payload field of the write datagram to which the slave participant 3 is intended to write the payload.

In order to achieve an increased time interval between the reception of the control data field 221 and the reception of the payload field 222 in the write datagram, the master participant 2 uses a special message structure, wherein one possible embodiment is shown in FIG. 3. The Ethernet message is essentially composed by the fieldbus connection 23 in the master participant 2 and is output onto the transmission path 1 in such a way that the write datagram is arranged subdivided in the message, wherein at least the control data field of a further datagram is arranged between the control data field and the payload field of the write datagram.

In the message design shown in FIG. 3, the write datagram control data fields S221a to S221n of all write datagrams are arranged in the Ethernet message following the Ethernet header 100 and the EtherCAT header 210, followed by the read datagrams L220a to L220n and then the payload fields S222a to S222n of the write datagrams and, at the end of the message, the check field FCS 300. In order to achieve an additional extension, the possibility exists of inserting further datagrams containing, for example, parameters or diagnostic data, along with the read datagrams L220a to L220n between the write datagram control data fields S221a to S221n and the write datagram payload fields S222a to S222n. Additional datagrams in the form of empty datagrams without a particular function can also be arranged between the write datagram control data fields S221a to S221n and the write datagram payload fields S222a to S222n for the bit interval extension.

A plurality of possibilities exist so that the slave participant 3 can recognize that the write datagrams are subdivided, wherein further data are inserted between the control data field of the write datagram and the payload field of the write datagram.

The master participant 2 can thus transmit the corresponding information, for example with a broadcast message, to the slave participants 3. The data length in the message between the control data field of the write datagram and the payload field of the write datagram can also be predefined. Alternatively, the possibility exists for the master participant 2 to define with each message, preferably in the Ethernet header 100 or in the EtherCAT header 210, that the write datagrams are subdivided in the message, wherein the control data field and the payload field are arranged separately, with datagrams between them. A command field in the Ethernet header 100 or in the EtherCAT header 210 can be used as an identification data field for this purpose. For the definition of the data length in the message between the control data field of the write datagram and the payload field of the write datagram, a further identification data field which indicates the corresponding datum can then be provided in the Ethernet header 100 or in the EtherCAT header 210.

Alternatively, the possibility also exists for an identification data field, the datum of which, as a value or length indication, indicates the position of the allocated payload field S222a to S222n to be provided in the control data field S221a to S221n of the write datagram in the message. The slave participant 3 can then determine the position of the area addressed to it in the payload field of the write datagram by evaluating this identification data field if the write datagram is addressed to it.

A simple procedure in which no additional identification fields are required other than the indication that the write datagrams are in each case arranged in divided form in the control data field and the payload field in the message can be achieved with a procedure whereby the control data field of the datagram and the payload field of the datagram in each case have a fixed data length, wherein the slave participant 3 detects the number of write datagrams if the identification data field of the message indicates that the control data field and the payload field are arranged separately in the write datagrams in the message. The slave participant 3 also counts the write datagrams during the transmission of the message in order to determine the corresponding position of the associated payload field in the message if a data area in the slave participant 3 is addressed, by evaluating the number with simultaneous knowledge of the fixed datagram length following evaluation of the address field in the write datagram.

The invention has been illustrated and described in detail with the aid of the preferred exemplary embodiments. Nevertheless, the invention is not restricted to the examples disclosed. Rather, other variants may be derived therefrom by a person skilled in the art without departing from the protective scope of the invention.

What is claimed is:

1. A method for data transmission in a communication network, with a data transmission path via which a master participant and at least one slave participant communicate with one another, wherein the master participant outputs messages on the data transmission path with which the slave participants exchange data on the fly, wherein the messages outputted by the master participant each contain a plurality of datagrams, each datagram comprising a control data field and a payload field, wherein the control data field has a command field and an address field, wherein the command field defines the data transmission procedure which is to be performed by the slave participant with the payload field, and the address field defines the data area in the slave participant with which the slave participant is intended to exchange data during the transmission of the payload field, wherein, in at least one message which has at least one datagram which is a write datagram in which the command field defines the data transmission procedure which is to be performed by the slave participant with the payload field as a write procedure, at least the control data field of a further datagram is disposed between the control data field of the write datagram and the payload field of the write datagram.

2. The method according to claim 1, wherein the message has a header data field which comprises an identification data field whose datum indicates whether the control data field and the payload field are arranged separately in the write datagrams in the message.

3. The method according to claim 2, wherein the control data field of the datagram and the payload field of the datagram in each case have a fixed data length, wherein the slave participants detect the number of write datagrams if the identification data field in the header data field of the message indicates that the control data field and the payload field are arranged separately in the write datagrams in the message.

4. The method according to claim 1, wherein the control data field of the write datagram in the message comprises an identification data field from which the position of the allocated payload field is obtained.

5. The method according to claim 1, wherein the data length in the message between the control data field of the write datagram and the payload field of the write datagram is permanently set.

6. The method according to claim 1, wherein the messages output by the master participant are designed in such a way that the control data fields of all write datagrams are arranged first in the message.

7. The method according to claim 6, wherein the read datagrams in which the command field defines the data transmission procedure which is to be performed by a slave participant with the payload field as a read procedure are arranged in the message after the control data fields of the write datagrams.

8. The method according to claim 1, wherein the data transmission rate on the data transmission path during the transmission of the message between the participants is greater than the data transmission rate in at least one slave participant during the transmission of the message.

9. A communication network with a data transmission path via which a master participant and at least one slave participant communicate with one another, wherein the master participant is designed to output messages onto the data transmission path with which the slave participants can exchange data on the fly, wherein the messages outputted by the master participant each contain a plurality of datagrams each datagram comprising a control data field and a payload field, wherein the control data field has a command field and an address field, wherein the command field defines the data transmission procedure which is to be performed by the slave participant with the payload field, and the address field defines the data area in the slave participant with which the slave participant is intended to exchange data during the transmission of the payload field, wherein, in at least one message which has at least one datagram which is a write datagram in which the command field defines the data transmission procedure which is to be performed by the slave participant with the payload field as a write procedure, at least the control data field of a further datagram is disposed between the control data field of the write datagram and the payload field of the write datagram.

10. The communication network according to claim 9, wherein the message has a header data field which comprises an identification data field whose datum indicates whether the control data field and the payload field are arranged separately in the write datagrams in the message.

11. The communication network according to claim 10, wherein the control data field of the datagram and the payload field of the datagram in each case have a fixed data length, wherein the slave participants detect the number of write datagrams if the identification data field in the header data field of the message indicates that the control data field and the payload field are arranged separately in the write datagrams in the message.

12. The method according to claim 9, wherein the control data field of the write datagram in the message comprises an identification data field from which the position of the allocated payload field is obtained.

13. The communication network according to claim 9, wherein the data length in the message between the control data field of the write datagram and the payload field of the write datagram is permanently set.

14. The communication network according to claim 9, wherein the messages output by the master participant are designed in such a way that the control data fields of all write datagrams are arranged first in the message.

15. The communication network according to claim 14, wherein the read datagrams in which the command field defines the data transmission procedure which is to be performed by a slave participant with the payload field as a read procedure are arranged in the message after the control data fields of the write datagrams.

16. The communication network according to claim 15, wherein the data transmission rate on the data transmission path during the transmission of the message between the participants is greater than the data transmission rate in at least one slave participant during the transmission of the message.

17. The communication network according to claim 9, wherein the communication network is an Ethernet-based fieldbus system, in particular an EtherCAT fieldbus system.

18. A master participant for a communication network with a data transmission path via which the master participant and at least one slave participant communicate with one another, which is designed to output messages onto the data transmission path with which the slave participants can exchange data on the fly, wherein the messages each contain a plurality of datagrams, each datagram comprising a control data field and a payload field, wherein the control data field has a command field and an address field, wherein the command field defines the data transmission procedure which is to be performed by the slave participant with the payload field, and the address field defines the data area in the slave participant with which the slave participant is intended to exchange during the transmission of the payload field, wherein, in the case of at least one message which has at least one datagram which is a write datagram in which the command field defines the data transmission procedure which is to be performed by the slave participant with the payload field as a write procedure, at least the control data field of a further datagram is arranged between the control data field of the write datagram and the payload field of the write datagram.

19. The master participant according to claim 18, which is designed to structure the messages in such a way that the control data fields of all write datagrams are arranged first in the message.

20. The master participant according to claim 18, which is designed to structure the messages in such a way that the read datagrams in which the command field defines the data transmission procedure which is to be performed by a slave participant with the payload field as a read procedure are arranged in the message after the control data fields of the write datagrams.

* * * * *